Patented Nov. 23, 1948

2,454,456

UNITED STATES PATENT OFFICE 2,454,456

MATERIALS FOR DENTAL PURPOSES

Christe Joannides, Edgware, England

No Drawing. Application February 11, 1944, Serial No. 521,970. In Great Britain March 12, 1943

4 Claims. (Cl. 260—765)

This invention relates to dental rubbers and has for its object to provide a new kind of rubber, unusual in colour when vulcanised compared with existing dental rubber, combining strength and lightness for the purpose of making full or partial dentures and means whereby the vulcanised surface colour can be changed to pink after such dentures have been polished, thus overcoming the known necessity of using two different coloured rubbers in the production of dentures—namely, one for the bulk of the plate, and a pink facing rubber to imitate natural gum for those parts which may be visible in the mouth.

Such rubber may be used in the place of an ordinary base one for making dentures, and the surface colour of any visible portion only changed to pink, or, as a facing in combination with ordinary base rubber, the surface of such facing to be changed to pink after vulcanisation and polishing of the denture, giving a stronger plate than would be the case if ordinary pink facing rubber were used.

Pink facing rubber is manufactured in two tones—light and medium—by compounding rubber with sulphur, and overloading the mix with a white pigment of zinc sulphide, or lithopon, and a red pigment or colouring matter such as vermilion or cadmium red, in order to obtain the desired colour after vulcanisation.

Base rubber is manufactured in a wide variety of colours such as red, orange, maroon, brown, etc. by compounding rubber with sulphur and vermilion or cadmium red for colouring, but without the addition of white pigments. Other base rubbers such as black or dark elastic, containing no red colouring, are also used but to a lesser extent. The colour variations may be said to be due to the manufacturer's efforts to obtain the maximum strength in a base rubber, and the colour range is left to the choice of the individual dentist.

The strength and lightness of base rubber containing red colour is achieved by reducing the ratio of red colouring to the rubber content, with the result that the high percentage of rubber without white pigment in the mix increases the tendency to expansion and the possibility of distortion of the mould and of the rubber becoming porous in its vulcanised state, particularly in lower thick plates and finally, causing the creepage of vulcanite away from the teeth due to contraction while the case is cooling.

Pink rubber on the other hand, is practically immune to expansion and contraction, and the subsequent porosity, due to the large amount of white pigment. Compared with base rubber, the total amount of ingredients in the pink compound is much higher to the ratio of rubber, with the result that its strength is considerably reduced, and it becomes brittle. Also, compared again with base rubber, the weight of ordinary pink rubber is greatly increased due to the overloading in particular with the high specific gravity of red colouring.

Furthermore, the necessity of using this ordinary pink rubber solely to represent natural gum complicates the production of vulcanite dentures. Because of its brittleness, some dentists reinforce the pink gum portion from behind with base rubber, but in addition to the difficulty of packing this way, there is the risk of the base rubber passing through by displacing the pink, and if visible it mars the appearance of the finished denture. To avoid this, the whole thickness of artificial gum portion is practically always built up entirely of pink rubber, and in consequence this method not only tends to increase the weight of the denture, but also considerably reduces its strength and there is the risk of teeth becoming detached from the plate during mastication.

The problem of pink rubber displacement has been completely overcome with the injection process, whereby pink rubber is toughened—before base rubber is injected—and remains in position as a true pink veneer backed by the injected rubber, giving a strong denture. In addition to this and other advantages, the injection process eliminates that nightmare of all dentists—the raised bite. Despite this advancement in prosthetic dentistry, the drawback of having no choice but to use two rubbers of different colours with which to construct a denture remained to be solved. It is obvious therefore, of the need of a single rubber suitable in all respects for making the whole plate, which together with the injection method, would revolutionize denture production, and it is reasonable to assume that such a rubber and method would be universally adopted in place of the two-part flask technique, and using two different coloured rubbers.

A so-called pink base rubber, made to be vulcanised in one hour at 100 lbs. pressure, and which remained pink after vulcanisation, was introduced by dental manufacturers years ago as a means to overcome making dentures of two different coloured rubbers, but owing to its brittleness and weight this pink base rubber defeated its own object by not differing materially from ordinary pink facing rubber—due to the rubber content being less than 33% of the compound; consequently it did not find favour among dentists.

This is substantiated by the fact that the system of making dental rubbers in different colours for the base and pink facing still continues in the same way, as any effort to produce a pink base rubber which remains pink after vulcanisation and still be strong and light enough for producing the whole denture is doomed to be a failure because the colour of crude rubber when mixed with sulphur alone takes on a blackish hue when vulcanised, and this hue can only be prevented by over-loading the mix with white and red pigments.

The object of this invention is to provide an intermediate product between base and pink rubbers, suitable for making the whole plate, but without the disadvantages referred to, and accordingly the invention comprises a method based on a new principle for producing a new article of manufacture wherein the finished denture, in addition to its strength, lightness, and density, will take on a suitable pink colour.

The method consists of compounding crude rubber—preferably water white crepe—with sufficient sulphur to effect vulcanisation, a proportion of titanium dioxide—having great obliterating power—as white pigment, and cadmium red of suitable shade—used instead of vermilion because of its low specific gravity—as colouring, except where weight is of advantage, but of comparatively much smaller amount by weight than zinc sulphide or lithopon and red colouring used for the usual pink facing and pink base rubbers, which allows an increase in the crude rubber content, but in such an amount and proportion, that while the colour of this new rubber is pink before vulcanisation, it will produce a vulcanite unsuitable to be used immediately as pink, having a colour like, or similar to, light brownish pink to brownish pink, being the nearest colour description that can be given, the variations in colour being governed according to the percentage of crude rubber content in the mix and the kind and purity of the pigment.

Thus, a plate made according to this method from a compound containing in the neighbourhood of 40% crude rubber, vulcanised and then having its polished surface exposed to sunlight, a pleasing pink colour will result. This change in colour is surface only, being in contradistinction to the usual pink base and facing rubbers, which are pink in their vulcanised state all through the mass, while the pink colour given to this new vulcanite is effected according to the percentage of crude rubber content and the intensity of light to which the vulcanite surface is exposed. By this system of changing the surface colour to pink after vulcanisation and polishing of the denture, while a compound having in the neighbourhood of 50% crude rubber, which will give a denture lightness, strength and density, is given as an example, it is possible to increase the crude rubber content above 50% or even 60%, the latter particularly depending on the obliterating power of white and red pigments. With this increase, a corresponding decrease takes place in white and red pigments or colouring matter, resulting in a vulcanite having further strength and lightness. On the other hand there are variations in the colour of the vulcanite so made, and the time of exposure to sunlight is accordingly increased to obtain the pink colour, more so when the crude rubber content approaches 60%.

A lamp of high intensity or one giving strong actinic value may also be used as an alternative, or in addition, to exposure to light.

When this new rubber is vulcanised in half-an-hour by the usual means of adding accelerators to the mix, the vulcanite so made has a lighter colour which facilitates the taking on of a pink colour to its polished surface. This is essential in order to obtain lighter colour particularly with a compound having high percentage of crude rubber content.

As an alternative to the method of reducing the vulcanising time from one hour to half-an-hour by accelerators metallic saw-dust or suitable sized particles of metal, preferably of aluminium, which is not affected by sulphur and has a high heat conductivity, may be mixed with plaster of Paris ready for use, or, the metal may be supplied separately to be added to the plaster as needed in the proportion of three or four plaster to one of metal by measure, thereby having the effect of reducing the vulcanising time of the one hour rubber to half-an-hour or less, according to the proportion of metal to the plaster, and also of the transmission of heat to the denture depending on the size of the flask in which the rubber is vulcanised. Other suitable metals may be used, and their proportion to the plaster will depend on the specific gravity and heat conductivity of such metals.

Consequently, by combining the two methods referred to, the time of vulcanisation may be reduced to a quarter of an hour, or less, and the vulcanite so made having a somewhat lighter colour, the polished surface of which will acquire a pink colour even more easily.

I have found that when this vulcanite is immersed in a solution of hydrogen peroxide, the volume depending on and according to the intensity of light and also to the percentage of crude rubber content, it facilitates the time taken to change the surface colour to pink by exposure. For instance, by subjecting the vulcanite having in the neighbourhood of 40% crude rubber content to a weak solution of 2%–3% in volume—for example, overnight—removing it, and giving it further exposure to light, there is a reduction in time in obtaining a pink colour. For dentures made from compounds having in the neighbourhood of 50% crude rubber, the strength of the solution may be increased to 4% to 5% in volume. During periods of brilliant sunshine, the surface of the vulcanite will react to the sun's rays without the aid of the solution. To shorten, however, the time in which to take on the pink colour, the denture may be immersed in the solution, but should be kept under observation and removed before bleaching occurs. Should this happen, the vulcanite can be repolished to restore the original colour, and the operation of obtaining the pink colour recommenced.

Observations prove however that the purity and kind of crude rubber used—for example wild rubber gives a somewhat darker colour to the vulcanite; the percentage of crude rubber content; the purity and fineness of the compounding ingredients; the over vulcanisation of the rubber giving the vulcanite a darker colour; the strength of the oxidising solution; the size of the flask used affecting the transmission of heat to the rubber; the length of time of exposure; the intensity of sunlight on the polished vulcanite surface; seasonal weather etc. which delays the change to pink colour; all are factors controlling the time required to obtain the pink surface colour.

It is known that dentists sometimes expose the gum portion of a denture made from ordinary pink rubber to the sunlight or daylight to improve the colour, but this is purely optional, because ordinary pink rubbers remain pink after vulcanisation, and the dentures made with them are ready for immediate use after polishing. This fact differentiates this new rubber which after vulcanisation is not pink, and cannot be called pink, until treated according to this invention.

Accelerators with the aid of activators used for reducing the vulcanising time from one hour to half-an-hour, not being new and as they are known to the trade, their choice are left to the individual manufacturer.

As time is a most important factor facing the busy dentist, and particularly the large laboratories, the time taken to bring a pink colour to the polished surface of this new vulcanite is largely controlled by the vagaries of the weather, and according to the main features of the invention the changing of the surface colour to pink is effected with phenomenal speed and almost instantaneously by wiping or brushing the polished surface with cotton wool impregnated with a solution of benzoyl peroxide—being the most effective peroxide—in a chlorinated solvent such as chloroform, methylene chloride or other chlorinated solvent. The percentage of benzoyl peroxide may vary 2% to 5% or more but even a smaller percentage will act in a chlorinated solvent, while if acetone is used as solvent the effect is comparatively very small, and if desired, then exposed to light to further improve the colour. The effect of these chemicals is such that even a pink colour brought to a polished surface by light will become lighter in shade when wiped with this solution. The solution may also be used for dentures made from ordinary dental rubbers to improve their colours.

This particular method of effecting the change in colour has revealed that the pink colour so obtained penetrates deeper into the vulcanite polished surface, and it is found that it requires vigorous buffing to remove it in an effort to restore the original colour, whereas that pink tone obtained by exposure to sunlight requires less buffing to remove.

One of the great advantages with this method is that in spite of the speed in changing the colour to pink, no bleaching takes place even if two or three applications are made. The effect of these would be to give a lighter shade and a dull finish to the vulcanite surface, this surface could be left dull, or given a new lustre by light buffing. In view of the quick changing the colour of the vulcanised denture to pink, the compounds having in the neighbourhood of 50% of crude rubber will be the probable selection when this new rubber is marketed. The manufacture of this one rubber, instead of several grades, not only simplifies production, but embodies all the requirements in a vulcanite denture, i. e., strength, lightness, density, pink colour.

By comparison, dentures hitherto made of two rubbers different in colour, weight, strength, density and even in price, may now be constructed with one rubber, uniform in colour and strength throughout with all the advantages claimed; all of which will appeal to, and readily find approval in the dental profession.

For best results the purest titanium dioxide should be compounded.

The formulas given herein are only by way of example, and any intermediate compound may be made whilst variations in the tone of pink may, to some extent, be obtained by the length of time of exposure to light and the repeated application of chemicals referred to. The variations in the colour may be obtained by adjusting the shades and proportion of cadium red to titanium dioxide. The degree and time of vulcanisation may be also adjusted according to the percentage of sulphur, percentage and activity of the accelerators used; an amount over and above what is necessary to give the right vulcanisation, particularly in a compound containing high percentage of rubber, should be avoided and after vulcanisation, it is recommended that in all cases the pressure should be allowed to drop to zero before the vulcaniser is opened. Variations in the colour may also be obtained by mixing in the compound some pure zinc sulphide and the like.

It will be appreciated that the necessity of storing such a great variety of different coloured rubbers is overcome by this invention, and the cost of producing this new dental rubber is considerably less by comparison with existing pink rubbers due to the substantial decrease of expensive red colouring used in compounding it; a comparison of the compounds having 40%, 50% and 60% crude rubber content shows the great reduction in the weight of white and red pigments when the crude rubber has been so increased.

The speedy construction of dental plates is of major importance to every busy dentist, and a plate produced with this new rubber, either with the usual method of packing and in particular with the injection method, simplifies the whole technique of denture construction and increases production—because the time, degree of skill, and care required to pack a case successfully with two different coloured rubbers, belongs now to the past.

Cadmium red or cadmium solenite is used at present being the only red, except vermilion, which stands the high temperature of vulcanisation and the action of sulphur.

The invention is illustrated but not limited by the following examples in which the parts given are parts by weight.

*Example 1*

40 parts of crepe rubber, 12 parts of sulphur, 14 parts of cadmium red, 34 parts of titanium dioxide.

*Example 2*

50 parts of crepe rubber, 15 parts of sulphur, 10 parts of cadmium red, 25 parts of titanium dioxide.

*Example 3*

60 parts of crepe rubber, 18 parts of sulphur, 7 parts of cadmium red, 15 parts of titanium dioxide.

In the illustrative examples given above, reference has been made to certain proportions of pigments. I have found that pigments available commercially vary greatly in regard to the colouring properties that they possess. It is therefore to be understood that the proportions of pigments actually employed in the carrying out of my invention depend upon the results that are to be obtained as judged by an expert.

I claim:
1. A vulcanizable rubber compound having sufficient strength and sufficiently low specific gravity for the manufacture of whole dentures, which contains 40 to 60% crude rubber, 12 to 18% sulphur, 6 to 14% cadmium red and 16 to 34% titanium dioxide.
2. A vulcanisable rubber compound comprising 40 parts by weight of rubber, 12 parts by weight of sulphur, 14 parts by weight of cadmium red and 34 parts by weight titanium dioxide.
3. A vulcanisable ruber compound consisting essentially of 50 parts by weight of rubber, 15 parts by weight of sulphur, 10 parts by weight of cadmium red and 25 parts by weight of titanium dioxide.
4. A vulcanisable rubber compound comprising 60 parts by weight of ruber, 18 parts by weight of sulphur, 7 parts by weight of cadmium red and 15 parts by weight of titanium dioxide.

CHRISTE JOANNIDES.

REFERENCES CITED

The following references are of record in the file of this patent:

UNITED STATES PATENTS

| Number | Name | Date |
|---|---|---|
| 51,846 | Malcom | Jan. 2, 1866 |
| 1,221,083 | Nixon | Apr. 3, 1917 |
| 1,413,071 | Swartz et al. | Apr. 18, 1922 |
| 2,102,456 | Brill et al. | Dec. 14, 1937 |
| 2,115,034 | Monroe | Apr. 26, 1938 |

FOREIGN PATENTS

| Number | Country | Date |
|---|---|---|
| 12,203 | Great Britain | 1905 |